Oct. 26, 1926.  
P. S. SHIELD  
1,604,791  
SAFETY MECHANISM FOR VEHICLE TANKS  
Filed March 12, 1925   2 Sheets-Sheet 2
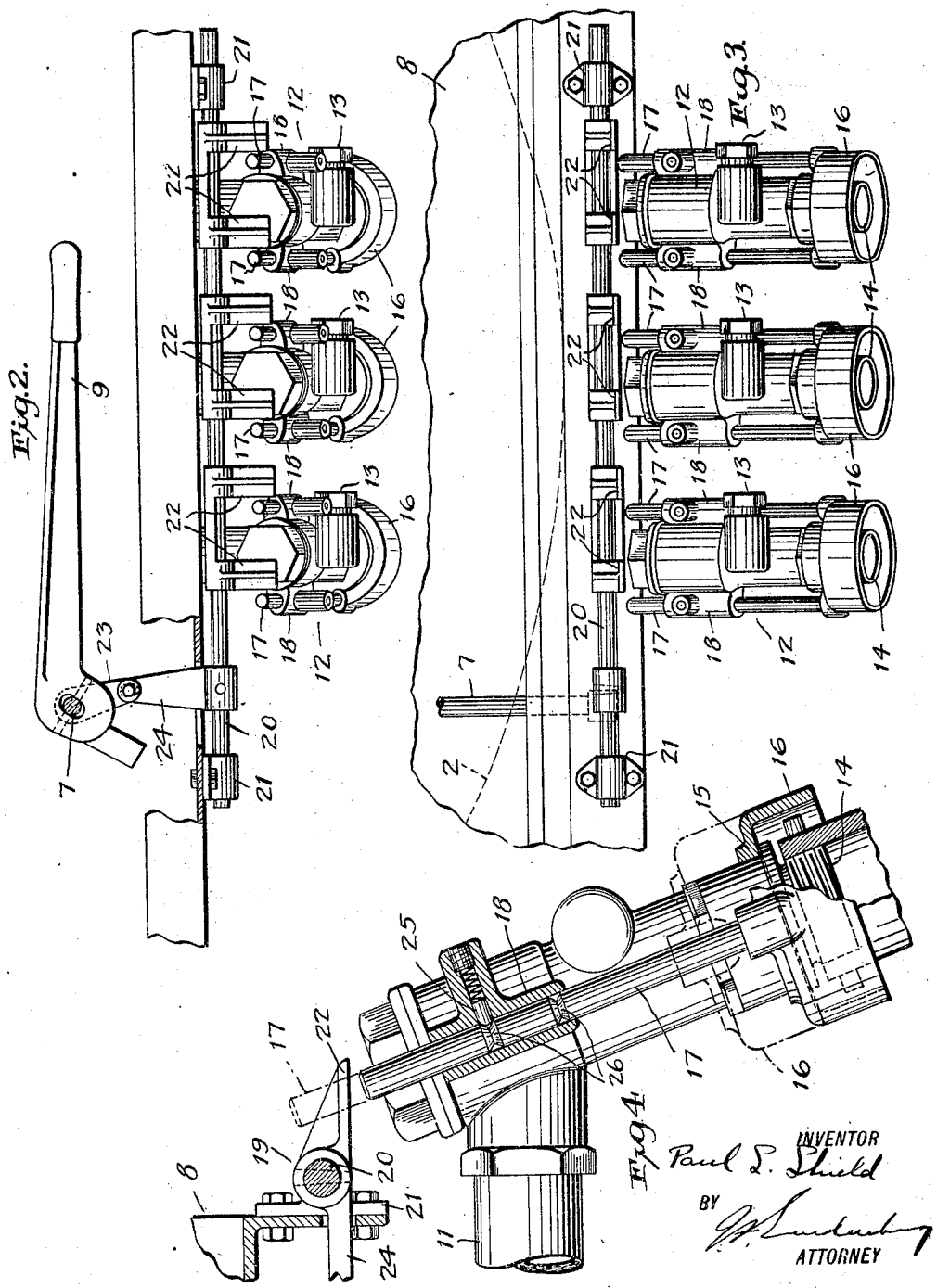

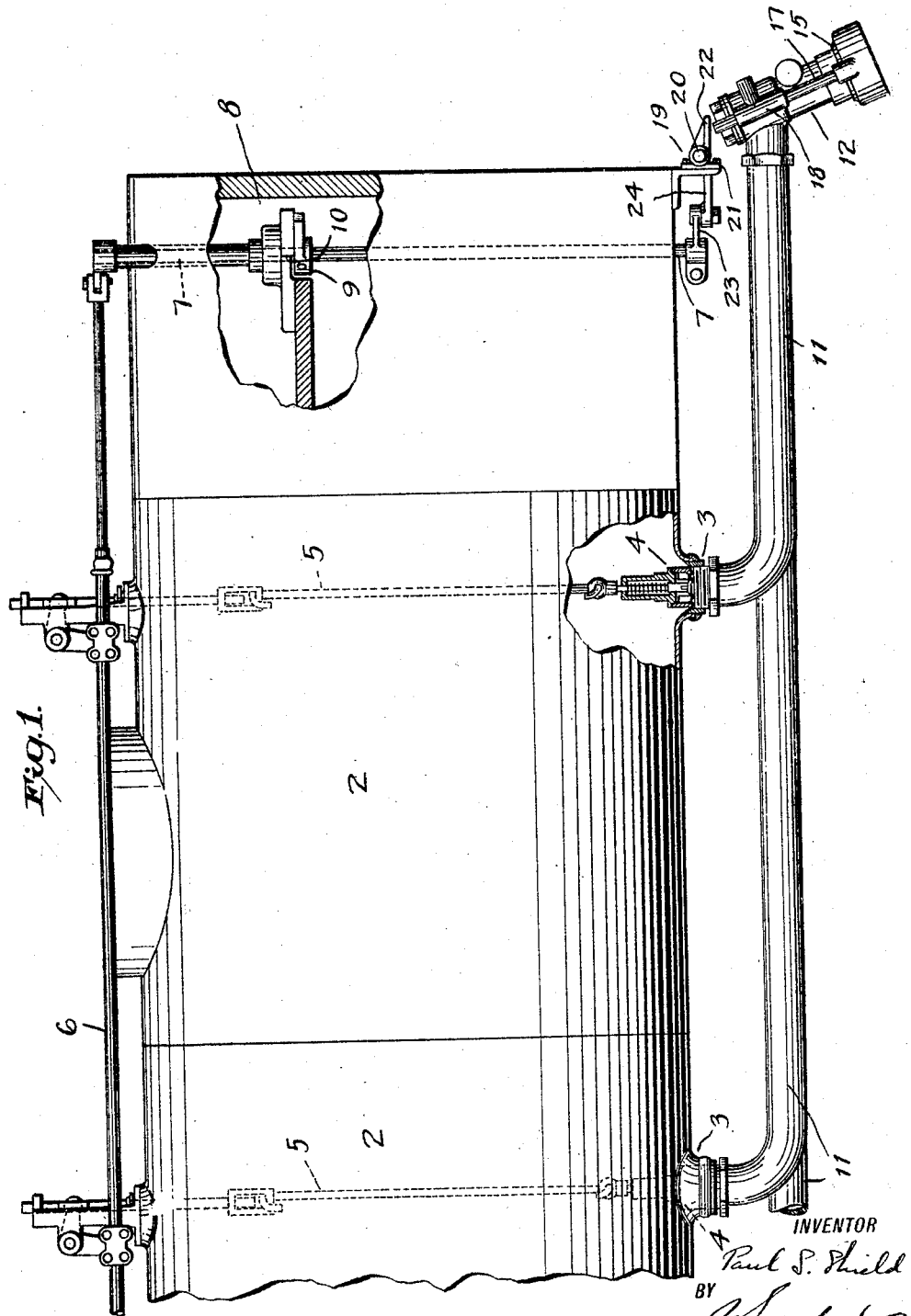

Patented Oct. 26, 1926.

1,604,791

UNITED STATES PATENT OFFICE.

PAUL S. SHIELD, OF CINCINNATI, OHIO, ASSIGNOR TO AUGUSTINE DAVIS, JR., OF CINCINNATI, OHIO.

SAFETY MECHANISM FOR VEHICLE TANKS.

Application filed March 12, 1925. Serial No. 14,996.

The invention relates to dispensing tanks, and more particularly to tank trucks for making deliveries of gasoline or explosive liquid in cities, and the object is to provide an important relation and cooperation of operating parts of a simple and reliable nature compelling the driver to close his emergency valve or other safety valve in order that he may disconnect his hose after making a delivery.

In the accompanying drawings forming a part hereof:

Fig. 1 is a side elevation of the rear part of a plural-compartment truck tank, with portions of the walls of the tank and of the rear end box broken away;

Fig. 2 is a fragmentary plan view of the faucets and related parts at the rear end of the tank;

Fig. 3 is a rear elevation of the parts seen in Fig. 2; and

Fig. 4 is a side elevation on a larger scale, with parts broken away and in section, of one of the faucets and the related parts, showing in full and broken lines two positions of the hose connection guard, the hose connection being shown attached.

The drawing represents a tank truck the longitudinal tank body of which is subdivided into separate tank chambers 2, each having a bottom outlet 3 commanded by an "emergency valve" 4, which is movable up and down in the lower part of the tank, away from and to a seat. These valves are intended to be closed except when deliveries of gasoline or other liquid are being made, and are kept closed by spring pressure, gravity or the pressure of the liquid. They are operated by suitable mechanism, illustrated as of a known form comprising pull connections 5 extending from the valves upward through the interior and the top of the tank, a control rod 6 extending longitudinally over the upper portion of the tank to which these branch connections are connected, a vertical rock-shaft 7 to which the rear end of the control rod is connected, said rock-shaft passing downward within a bucket-box, or other box, 8 at the rear end of the tank, and a lever handle 9 on this shaft, the lever handle being pivotally connected with the shaft so that it may be tilted up and down to engage or disengage it with a holding lug 10 for holding the valve mechanism in the open condition when desired. The invention is not necessarily limited to a unit control for the valves of a plurality of compartments.

As is customary in these tanks, pipes 11 are shown extending from the outlets 3 rearwardly beneath the tank, and terminating at the rear ends in faucets 12, the quick-closing spring-actuated valves of which may be opened by wrench handles applied to the sockets 13 in the usual manner.

The screw-threaded nozzles 14 are formed for hose-connections, the vehicle tank being designed to make enclosed, hose deliveries only, to underground storage tanks, as distinguished from bucket deliveries. For this purpose, an interlock is provided between the hose connection or connections and the emergency valve or valves, requiring the valve, or the valves, to be closed in order that the hose may be disconnected. This prevents the driver from driving away through city streets with his emergency valves unclosed, and thereby insures that, even though the faucets or piping should be broken by collision, the inflammable contents of the tank will not escape.

Sleeves 15 are mounted slidably on the nozzles so that their enlarged lower parts or guards 16 will either enclose or expose the hose-receiving ends. The guards are adapted when in the lower position to encircle the hose-connections so that a wrench can not be applied to remove them, while when the guards or sleeves are retracted to the upper position, the hose can be put on or taken off. The sleeves are shown provided with rods 17 which slide in bearings 18 on the sides of the faucets, the upper ends of these rods being related to a cooperating interlock member 19 in the form of a slide-rod 20 mounted to slide in bearings 21 on the lower part of the box 8 and carrying obstructing fingers or portions 22. In one position of the member these obstructions stand directly in the path of upward movement of the rods 17, so that the sleeves 15 can not be raised. In the other position of the members the parts are out of line, so that the sleeves can be retracted. The rod 20 is shown connected with the operating mechanism by a crank 23 on the lower end of the rock-shaft 7, loosely pivoted to an arm 24 on the rod, the relation being such that when the valve mechanism is closed the rod 20 is in non-obstructing position, while when the valves are open the rod is in obstructing position. It will be understood that after putting on the hose the corresponding sleeve must be lowered before the emergency valve or valves can be opened, as otherwise the fingers 22 would be obstructed by the upwardly projecting rods 17 of the sleeves.

The guard sleeves 15 may be non-positively held in the two positions by spring-pressed pins 25 cooperative with spaced grooves 26 in the rods 17.

While the preferred embodiment and mode of applying the invention has been described in detail, it will be understood that the invention is not limited to the precise form of the parts and mechanism illustrated. The form, location and specific nature of the valve, closing of which is to be compelled before disconnecting the hose, may be varied within the generic aspect of the invention, and the type of valve operating means or controls may likewise be varied.

What is claimed as new is:

1. In a tank vehicle, the combination of delivery means having a valve and a hose connection, means for controlling said valve, and an interlock between said hose connection and said valve controlling means compelling the valve to be closed in order that the hose may be disconnected.

2. In a tank vehicle, a tank having a bottom outlet, a valve in the tank commanding said outlet, operating mechanism connected with said valve, and a pipe leading from said outlet and terminating in a faucet adapted to receive a hose, in combination with a sleeve movably arranged on the faucet nozzle so as to enclose or expose the hose connection, and a member operatively connected with said operating mechanism and forming an obstruction to the retraction of said sleeve when said mechanism is in the open condition.

3. In a tank vehicle, the combination of a delivery connection designed to receive a hose, a safety valve, a movable guard associated with said delivery connection constructed and arranged in one position to obstruct removal of the hose, and means operatively connected with said valve and preventing movement of said guard to unobstructing position unless the valve is closed.

4. In a tank vehicle, the combination of a delivery connection designed to receive a hose, a safety valve, valve controlling means, and a lock for the hose connection operatively related to said valve controlling means and preventing disconnection of the hose unless said valve controlling means is operated to cause the valve to close.

PAUL S. SHIELD.